(12) United States Patent
Li et al.

(10) Patent No.: US 9,438,105 B2
(45) Date of Patent: Sep. 6, 2016

(54) SILICON-ON-INSULATOR-BASED VOLTAGE GENERATION CIRCUIT

(71) Applicant: SMARTER MICROELECTRONICS (GUANG ZHOU) CO., LTD., Guangzhou (CN)

(72) Inventors: Yang Li, Guangzhou (CN); Yaohui Guo, Guangzhou (CN); Jian Sun, Guangzhou (CN)

(73) Assignee: SMARTER MICROELECTRONICS (GUANG ZHOU) CO., LTD., Guangzhou (CN)

( * ) Notice: Subject to any disclaimer, the term of this patent is extended or adjusted under 35 U.S.C. 154(b) by 0 days.

(21) Appl. No.: 14/747,711

(22) Filed: Jun. 23, 2015

(65) Prior Publication Data

US 2015/0295492 A1 Oct. 15, 2015

Related U.S. Application Data

(63) Continuation of application No. PCT/CN2013/079747, filed on Jul. 19, 2013.

(30) Foreign Application Priority Data

Jul. 23, 2012 (CN) .......................... 2012 1 0255507

(51) Int. Cl.
*H02M 3/07* (2006.01)
*G05F 3/20* (2006.01)
(52) U.S. Cl.
CPC ................ *H02M 3/07* (2013.01); *G05F 3/205* (2013.01); *H02M 2003/071* (2013.01)

(58) Field of Classification Search
CPC . H02M 3/07; H02M 2003/071; G05F 3/205; G05F 3/242; G05F 3/245
See application file for complete search history.

(56) References Cited

U.S. PATENT DOCUMENTS

| 2007/0194834 A1* | 8/2007 | Sohara | H02M 3/07 327/536 |
| 2009/0039947 A1* | 2/2009 | Williams | H02M 3/07 327/536 |
| 2013/0169198 A1* | 7/2013 | Wei | H02P 31/00 318/116 |

* cited by examiner

*Primary Examiner* — Jung Kim
(74) *Attorney, Agent, or Firm* — Syncoda LLC; Feng Ma; Junjie Feng

(57) ABSTRACT

A silicon-on-insulator (SOI) based positive/negative voltage generation circuit includes: an inverter including an NMOS transistor and a PMOS transistor, a first transfer capacitor coupled to the PMOS transistor, a first output capacitor, a second transfer capacitor coupled to the NMOS transistor, a second output capacitor, a first diode disposed between the first transfer capacitor and the first output capacitor, a second diode disposed between the second transfer capacitor and the second output capacitor, one end of the first output capacitor is coupled to the ground, one end of the second output capacitor is coupled to the ground; wherein an output voltage of the inverter is controlled by a single-phase clock to flip periodically, charge the first transfer capacitor through a parasitic diode of the PMOS transistor, and charge the second transfer capacitor through a parasitic diode of the NMOS transistor.

20 Claims, 3 Drawing Sheets

SILICON-ON-INSULATOR-BASED VOLTAGE GENERATION CIRCUIT

CROSS-REFERENCE TO RELATED APPLICATIONS

The present application is a continuation of, and claims priority to, PCT/CN2013/079747 filed on Jul. 19, 2013, which claims priority to Chinese Patent Application CN 201210255507.2 filed on Jul. 23, 2012. The disclosures of the above applications are hereby incorporated by reference in their entirety.

BACKGROUND

In RF and microwave applications, due to good linearity, low losses and good integration, SOI process is used to implement switches, power amplifiers, low noise amplifiers, attenuators and phase shifters etc. In these applications, a positive voltage generator (PVG) which voltage is higher than power supply voltage and a negative voltage generator (NVG) which voltage is lower than ground voltage are widely used to increase the dynamic range of the processing power, achieve effective switch under DC bias conditions and lower static current in off state.

The positive voltage generation circuit in existing PVG and the negative voltage generation circuit in existing NVG mainly adopt charge pump circuit to complete voltage boost and generate negative voltage. In basic charge pump circuit, it is necessary to have a plurality of switches to control the directions of charging and discharging of capacitor; at the same time, in order to reduce ripple and switch losses, the size of the transistor switch that controls the charging and discharging of the capacitor must be large enough to reduce on-resistance, therefore, the existing positive/negative voltage generation circuit will take a larger chip area.

FIG. 1 is a schematic view of existing positive voltage generation circuit, as shown in FIG. 1, it comprises four transistor switches M1~M4, a transfer capacitor C1 and an output capacitor C2. Wherein, the transistor switches M1~M4 are controlled by control signal S1 and control signal S2 as shown in FIG. 3; wherein, the control signal S1 and the control signal S2 are two-phase non-overlapping clock signals. When the electrical level of control signal S1 is high, transistor switches M1 and M4 are turned on, transistor switches M2 and M3 are turned off. Ignoring transistor switch voltage drop in the on-state, the voltage of transfer capacitor C1 after the charging is finished is equal to the power supply voltage Vdd; when control signal S2 becomes high electrical level, transistor switches M1 and M4 are turned off, transistor switches M2 and M3 are turned on. At this moment, because V2 point is connected to power supply voltage Vdd through transistor switch M3, the charge on transfer capacitor C1 increase the voltage of V1 point to twice that of power supply voltage 2Vdd, and charge output capacitor C2 through transistor switch M2, under the control of control signal S2, the voltage of output capacitor C2 is about twice that of the voltage of the power supply 2Vdd.

FIG. 2 is a schematic view of existing negative voltage generation circuit; similarly, in the negative voltage generation circuit shown in FIG. 2, when control signal S1 is of high electrical level, the transistor switches M1 and M3 are turned on, the voltage of the transfer capacitor C1 is equal to the power supply voltage Vdd; when the control signal S2 is of high electrical level, the transistor switches M2 and M4 are turned on, at this moment, the transistor switch M2 is turned on so that the voltage of V1 point is zero; transfer capacitor C1 pulls the voltage of V2 point to negative power supply voltage −Vdd, at the same time, transistor switch M4 is turned on so that the voltage of VN point which output negative voltage is equal to the voltage of V2 point, that is, equal to the negative power supply voltage −Vdd.

It can be seen from FIGS. 1 and 2, the existing positive voltage generation circuit and negative voltage generation circuit, respectively, needs four larger size transistor switches, a total of eight transistor switches are needed, and the two control signals are two-phase non-overlapping clock signals, the selection of high electrical level or low electrical level for each transistor switch control signals are required to ensure that the gate-source voltage and gate-drain voltage of the transistor switch do not exceed the breakdown voltage of the gate oxide layer, at the same time, additional control signal generation circuit is required to generate the two-phase non-overlapping clock signal as shown in FIG. 3, thus the current positive/negative voltage generation circuit will take a large area on the chip.

In order to prevent overvoltage problem, especially when the switch path is with a DC bias, generally, it requires additional voltage offset circuit to ensure that the positive output voltage is lower than twice of power supply voltage 2Vdd, so that the negative output voltage is higher than the negative power supply voltage −Vdd, thus, will further increase the area of the entire positive and negative voltage generation circuit takes on the chip.

SUMMARY

In order to solve problems in existing technologies, the present disclosure provides a positive/negative voltage generation circuit in SOI process.

Embodiments of the present disclosure can effectively reduce the chip area occupied by the positive/negative voltage generation circuit which drive the switch in the SOI process.

The positive/negative voltage generation circuit in SOI process provided by embodiments of present disclosure requires only two transistor switches and a single-phase clock signal, the circuit adopts an inverter composed of N-channel metal oxide semiconductor field effect transistor (NMOS transistor) and P-channel metal-oxide semiconductor field effect transistors (PMOS transistor), and use parasitic diode, transfer capacitor, output capacitor and diodes arranged between the source electrode and the substrate of the metal oxide semiconductor field effect transistor (MOS tube) to form the positive/negative voltage generation circuit.

The output voltage of the inverter composed of NMOS transistor and PMOS transistor periodically switches between high electrical level and low electrical level under the control of a single-phase clock. When the output voltage of the inverter is of low electrical level, in the sub-circuit that generates positive voltage, the first transfer capacitor that is connected to PMOS transistor is charged through the parasitic diode between the substrate and the source electrode of PMOS transistor, because the first transfer capacitor that is connected to PMOS transistor cannot be changed suddenly, when the output of the inverter is turned from low electrical level to high electrical level, the first transfer capacitor will produce an electrical level that is nearly twice of the power supply voltage on the substrate of the PMOS transistor, this electrical level causes the first diode between the first transfer capacitor and the first output capacitor to be turned on, and charge from the first transfer capacitor to the first output capacitor, thus results positive output voltage, and ultimately the highest voltage on the first output capacitor that generates positive voltage is close to the value difference between twice power supply voltage and the voltage drop of all diodes on the charging path; Ultimately the lowest voltage on the second output capacitor that generates negative voltages is close to the value difference between twice power supply voltage and the voltage drop of all diodes on the discharging path.

Accordingly, in the sub-circuit that generates negative voltage, when the output of the inverter is of high electrical level, the second transfer capacitor that is connected to the NMOS transistor is charged through the parasitic diode between substrate and source electrode of NMOS transistor, since the voltage of the second transfer capacitor cannot change suddenly, when the output of the inverter changes from high electrical level to low electrical level, the second transfer capacitor will produce an electrical level that is close to the negative power supply voltage at the substrate of the NMOS transistor, this electrical level will turn on the second diode between the second transfer capacitor and the second output capacitor and discharge from the second output capacitor to the second transfer capacitor, thus result in negative output voltage, and ultimately, the lowest voltage on the second transfer capacitor that generates negative voltage is close to the value difference between the power supply voltage and the voltage drop of all diodes on the discharging path.

The beneficial effects of the present disclosure are: implementing a positive voltage generation circuit and a negative voltage generation circuit at the same time through adopting two MOS transistors, only need a single-phase clock to control, at the same time, the diode in the circuit can protect the switch transistor, compared with the existing positive/negative voltage generation circuits, It has simpler structure and takes less chip area.

DETAILED DESCRIPTION

Embodiments of the present disclosure is described by specific examples as follows.

Figure 1:
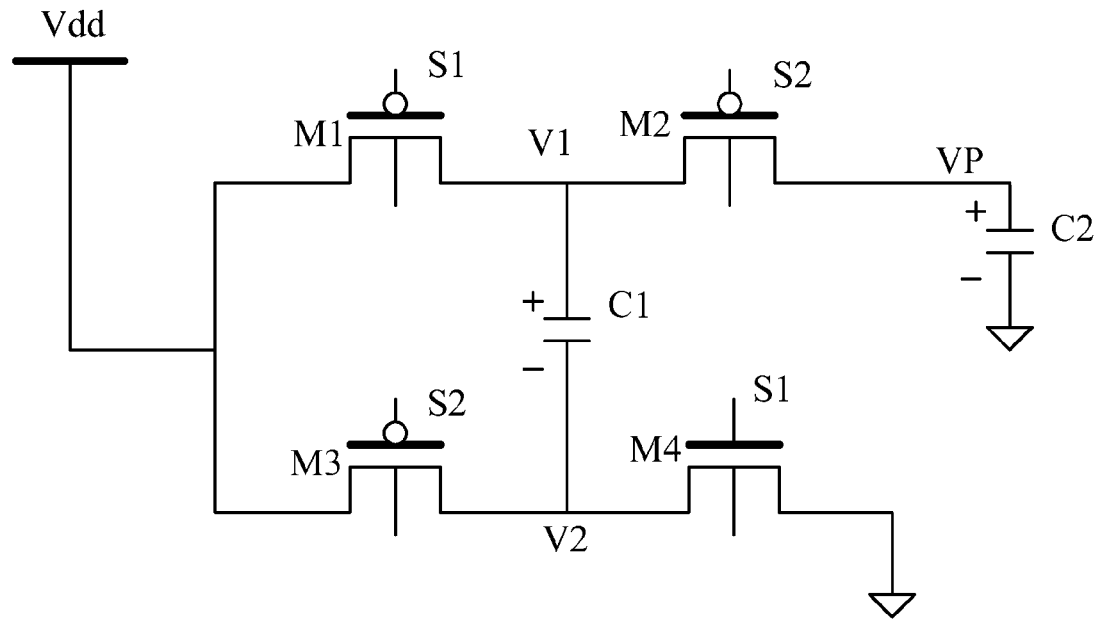
FIG. 1 is a schematic view of an existing positive voltage generation circuit.
Figure 2:
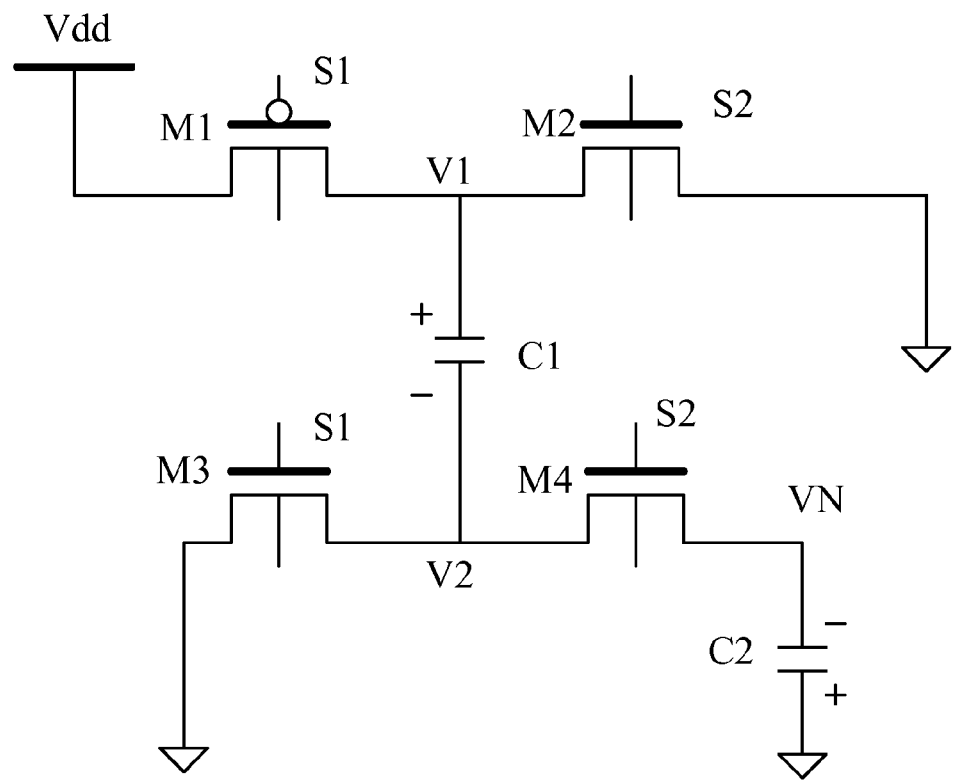
FIG. 2 is a schematic view of an existing negative voltage generation circuit.
Figure 3:
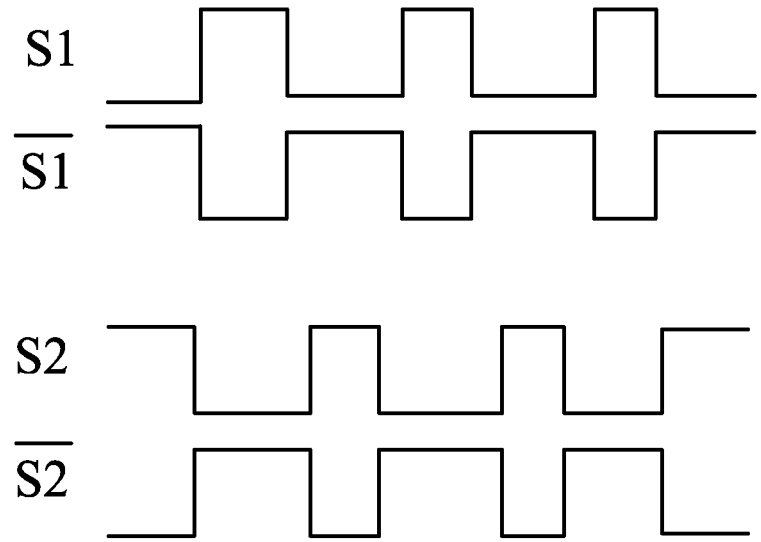
FIG. 3 is a schematic view of a two-phase non-overlapping clock waveform required by existing positive and negative voltage generation circuits.
Figure 4:
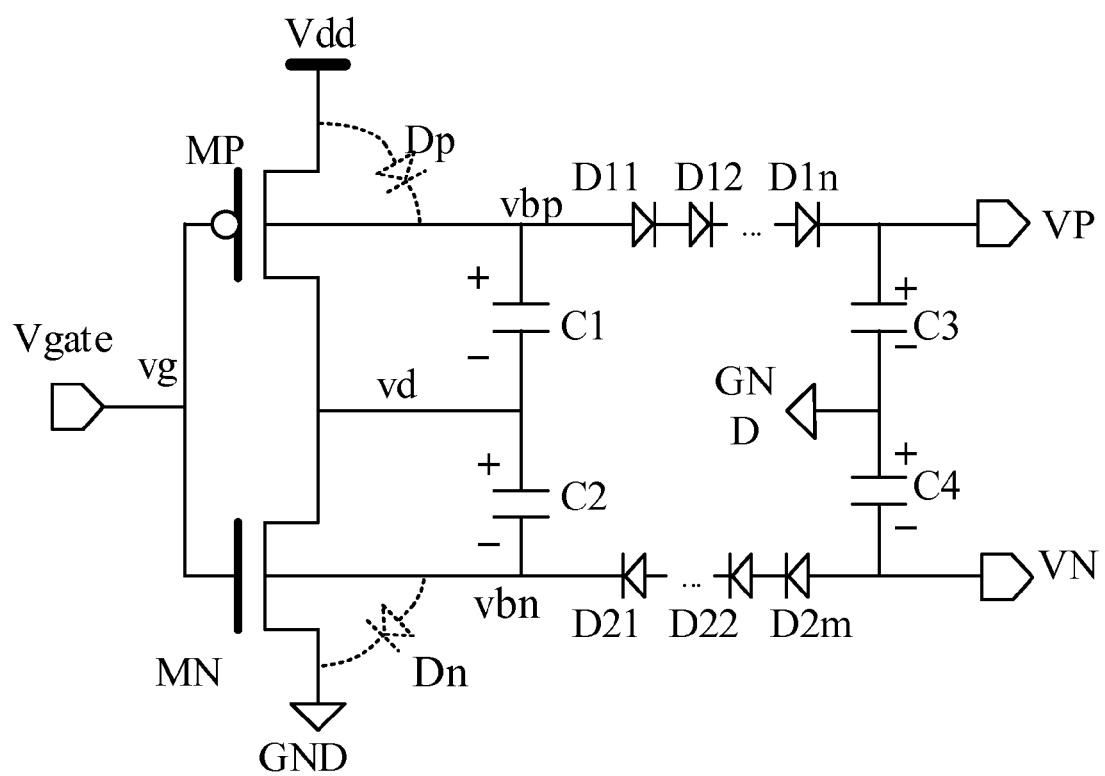
FIG. 4 is a schematic view of a positive/negative voltage generation circuit of the embodiments of the present disclosure.

FIG. 4 shows the structure of the positive/negative voltage generation circuit of the embodiments of the present disclosure, as shown in FIG. 4, the circuit comprise: an NMOS transistor MN, a PMOS transistor MP, a first transfer capacitor C1, a second transfer capacitor C2, a first output capacitor C3, a second output capacitor C4, a first diode D11~D1n between the first transfer capacitor C1 and the first output capacitor C3, a second diode D21~D2m between the second transfer capacitor C2 and the second output capacitor C4.

In FIG. 4, the first parasitic diode Dp is a parasitic diode between the source electrode and the substrate of PMOS transistor MP, the positive electrode of the first parasitic diode is the source electrode of the PMOS transistor MP, the negative electrode of the first parasitic diode Dp is the substrate of the PMOS transistor MP; the second parasitic diode Dn is a parasitic diode between the source electrode and the substrate of NMOS transistor MN, the positive electrode of the second parasitic diode Dn is the substrate of the NMOS transistor MN, the negative electrode of the second parasitic diode Dn is the source electrode of NMOS transistor MN.

In FIG. 4, PMOS transistor MP and NMOS transistor MN constitute an inverter, the gate electrode of NMOS transistor MN and the gate electrode of PMOS transistor MP are connected together, and connected to single-phase clock Vgate, in other words, the input end of the inverter is connected to the output end of single-phase clock Vgate, the drain electrode of NMOS transistor MN and the drain electrode of PMOS transistor MP are connected together as the output end of inverter vd; the source electrode of NMOS transistor MN is connected to ground electrical level GND, e.g., the source electrode of NMOS transistor MN is connected to the ground, the source electrode of the PMOS transistor MP is connected to power supply voltage Vdd; First transfer capacitor C1 is connected between the substrate of PMOS transistor MP vbp and the output end of inverter vd; the second transfer capacitor C2 is connected between the substrate of the NMOS transistor MN vbn and the output end of the inverter vd; One end of the first output capacitor C3 and the second output capacitor C4 is connected to the ground electrical level GND; e.g., one end of the first output capacitor C3 and the second output capacitor C4 is connected to the ground, the other end of the first output capacitor C3 is used as positive voltage output end VP, the other end of the second output capacitor is used as negative voltage output end VN; One or a plurality of first diodes D11-D1n are connected between the substrate of PMOS transistor vbp and the positive voltage output end VP; wherein, when one first diode D11 is connected between the substrate vbp of the PMOS transistor MP and the positive output end VP, the positive electrode of the first diode D11 is connected to the substrate vbp of the PMOS transistor MP, the negative electrode of the first diode D11 is connected to the positive voltage output end VP; when a plurality of first diodes D11-D1n are connected in series between the substrate of the PMOS transistor and the positive voltage output end VP, the positive electrode of the first diode D11 is connected to the substrate vbp of the PMOS transistor MP, the negative electrode of the first diode D1n is connected to the positive voltage output end VP. The substrate vbp of one or a plurality of second diodes D21-D2m are also connected between the substrate of the NMOS transistor MN and the negative voltage output end VN; wherein, when one second diode D21 is connected between the substrate vbn of the NMOS transistor MN and the negative voltage output end VN, the positive electrode of the second diode D21 is connected to the negative voltage output end VN, the negative electrode of the second diode D21 is connected to the substrate vbn of the NMOS transistor MN; when a plurality of second diodes D21-D2m are connected in series between the substrate vbn of the NMOS transistor MN and the negative voltage output end VN, the positive electrode of the second diode D2m is connected to the negative voltage output end VN, the negative electrode of the second diode D21 is connected to the substrate vbn of the NMOS transistor MN.

In practical applications, the number of the first diodes between the first transfer capacitor C1 and the first output capacitor C3 can be adjusted according to the output voltage required; accordingly, the number of second diodes between the second transfer capacitor C2 and the second output capacitor C4 can be adjusted according to the output voltage required.

In the descriptions below, the voltage of the output end of inverter vd is abbreviated as vd, the voltage of the substrate vbp of the PMOS transistor MP is abbreviated as vbp, power supply voltage Vdd is abbreviated as Vdd, the forward on voltage drop Vbe of the first parasitic diode Dp and the second parasitic diode Dn of the forward voltage drop Vbe is abbreviated as Vbe, the voltage of the first output capacitor C3 is abbreviated as VP, the voltage of the substrate vbn of the NMOS transistor is abbreviated as vbn, the voltage of the second output capacitor C4 is abbreviated as VN.

The working principles of the generation of positive voltage of the positive/negative voltage generation circuit of embodiments of the present disclosure, e.g. the working principles of the sub-circuit that generates positive voltage are as follows: when the input of the inverter, e.g., the output signal vg of the single-phase clock Vgate is of high electrical level, vd is equal to low electrical level, e.g, equal to the ground electrical level GND, at this moment, if there is no voltage on the first transfer capacitor C1, e.g., vbp is equal to vd, e.g, also equal to the ground electrical level GND, the voltage at both ends of the first parasitic diode Dp is reduced to Vdd which is greater than Vbe, therefore the first parasitic diode Dp is turned on, and the first transfer capacitor C1 is charged, charging is finished until vbp is equal to Vdd-Vbe, so when vd is of low electrical level, the voltage of the first transfer capacitor C1 is equal to Vdd-Vbe; at this moment, If the voltage of the first output capacitor C3 is lower, the first diodes D11~D1$n$ will be turned on, the current flows in a single direction from the first transfer capacitor C1 to the first output capacitor C3 through the first diodes D11-D1$n$, which results in a positive output voltage. Assuming that the on voltage of the first diodes D11~D1$n$ is also equal to Vbe, then the first output capacitor C3 is charged to Vdd−(n+1) Vbe. Here, n represents the number of the first diodes connected between the first transfer capacitor C1 and the first output capacitor C3.

When the input of the inverter, e.g. the output signal Vg of the single-phase clock Vgate is turned into low electrical level, vd is vdd, at this moment, because the voltage of the first transfer capacitor C1 cannot change suddenly, vbp is equal to vd plus the voltage of the first transfer capacitor C1, e.g., 2Vdd−Vbe; the increase of vbp causes the first transistors D11-D1$n$ to be turned on again and charge the first output capacitor C3. After the process of charging for many times, the highest voltage of the first output capacitor C3 is:

$$VP=2Vdd-(n+1)Vbe \quad (1)$$

wherein, n represents the number of first diodes connected between the first transfer capacitor C1 and the first output capacitor C3. When vd is of low electrical level and vbp decreases to Vdd−Vbe, vbp is lower than VP, but because of the reverse blocking effect of the first diodes D11~D1$n$, the charge on the first output capacitor C3 does not reversely flows to the first transfer capacitor C1. When the inversion frequency of the inverter is high enough so that the charge on the first output capacitor C3 can replenish, VP can be considered as a constant voltage: 2Vdd−(n+1) Vbe. The value of VP can be controlled by adjusting the number of the first diodes D11~D1$n$.

The working principles of generating negative voltage of the positive/negative voltage generation circuit of the embodiments of the present disclosure, e.g., the working principle of sub-circuit that generates negative voltage is similar to the working principle of generating positive voltage, when vd is equal to Vdd, the second parasitic diode Dn is turned on, the voltage of the second transfer capacitor Dn cannot change suddenly, vbn will decreases to 0−(Vdd−Vbe)=−Vdd+Vbe. At this moment, the voltage of the positive electrode of the second diodes D21-D2$m$ that are connected in series, e.g., VN is higher than the voltage of the negative electrode vbn, the second diodes are connected in series are turned on, the current flows from the output end of the negative electrode VN, e.g. the second output capacitor C4, in turn goes through the second diodes D2$m$-D21, the second transfer capacitor C2, towards the substrate vbn of the NMOS transistor MN, the second output capacitor C4 is discharged, thus results in negative output voltage. After several cycles of amplification, the negative voltage outputted by the second output capacitor C4 is:

$$VN=-Vdd+(m+1)Vbe \quad (2)$$

wherein, m represents the number of second diodes connected between the second transfer capacitor C2 and the second output capacitor C4.

By adjusting the number of second diodes D21~D2$m$, the value of VN can be controlled, the number of the second diodes D21~D2$m$ can be set according to the practical applications and the requirements for overvoltage protection.

Figure 5:
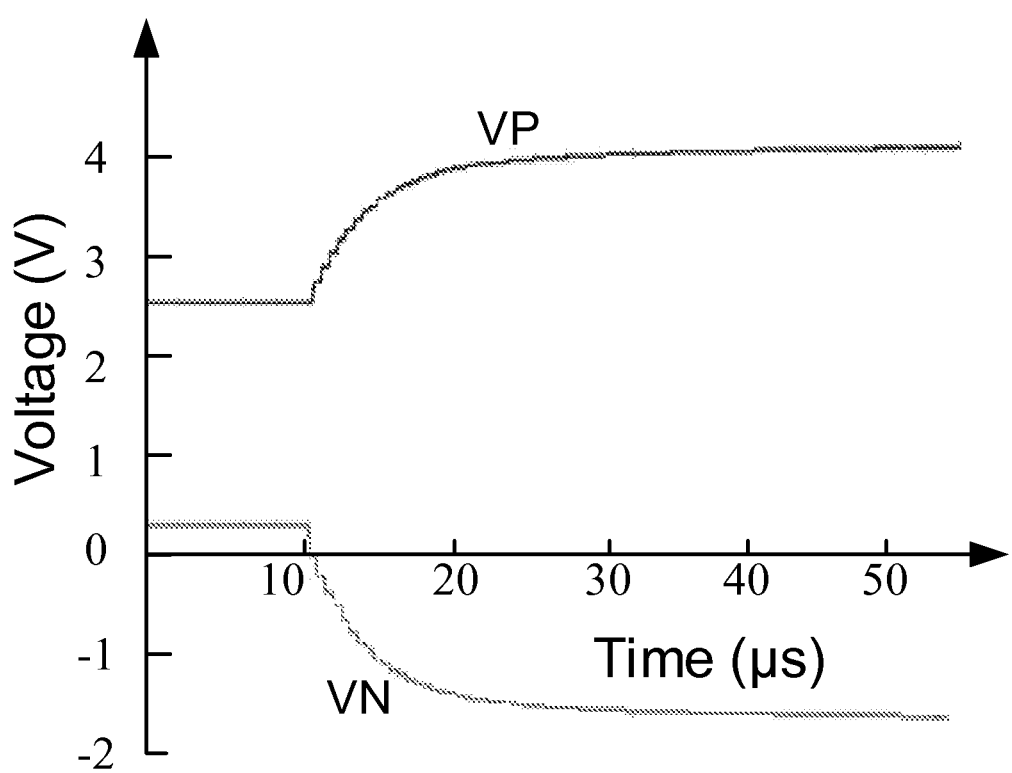
FIG. 5 is a schematic view of the work waveform of the positive/negative voltage generation circuit of embodiments of the present disclosure.

FIG. 5 is a schematic view of the simulation operating voltage waveform based on the positive/negative voltage generation circuit of the embodiments of the present disclosure. During simulation experiments, the power supply voltage used is 2.5V, only one first diode D11 is connected between the first transfer capacitor C1 and the first output capacitor C3, and only one second diode D21 is connected between the second transfer capacitor C2 and the second output capacitor C4, the total on voltage of the first patristic diode Dp, the second patristic diode Dn, the first diode D11 and the second diode D21 is about 1V, the circuit starts work from 10 us. It can be seen from FIG. 5, the voltage of the positive voltage output end VP gradually increase to about 4V, and the voltage of the negative voltage output end gradually decreased to −1.5V, this is consistent with the result of calculation of formula (1) and (2), e.g.: the positive voltage outputted by the positive voltage output end VP is higher than the power supply voltage, the negative voltage outputted by the negative voltage output end VN is lower than the low electrical level.

In practical applications, in the SOI process, the substrate used may be high-resistivity silicon, low-resistivity silicon, or silicon on complete insulator substrate, etc.

In summary, embodiments of the present disclosure provide a circuit that can generate positive and negative voltage at the same time in silicon-on-insulator process. This circuit uses the parasitic diode of the MOS transistor itself and the characteristic that the electrical level of the substrate of the MOS transistor in SOI process can change, using relatively less components to achieve the result of generating positive and negative voltage at the same time, compared with the conventional circuits, its structure is simpler and it takes less chip area.

All references referred to in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A silicon-on-insulator (SOI) based positive/negative voltage generation circuit, comprising:
   an inverter comprising an NMOS transistor and a PMOS transistor, a first transfer capacitor coupled to the PMOS transistor, a first output capacitor, a second transfer capacitor coupled to the NMOS transistor, a second output capacitor, a first diode disposed between the first transfer capacitor and the first output capacitor, a second diode disposed between the second transfer capacitor and the second output capacitor, one end of the first output capacitor is coupled to the ground, one end of the second output capacitor is coupled to the ground;
   wherein an output voltage of the inverter is controlled by a single-phase clock to flip periodically, charge the first transfer capacitor through a parasitic diode of the PMOS transistor, and charge the second transfer capacitor through a parasitic diode of the NMOS transistor;
   in a sub-circuit that generates a positive voltage, a unidirectional current flows from the first transfer capacitor through the first diode to the first output capacitor, thereby generating a positive output voltage; in a sub-circuit that generates a negative voltage, a unidirectional current flows from the second output capacitor through the second diode to the second transfer capacitor, thereby generating a negative output voltage.

2. The circuit of claim 1, wherein the first diode comprises one or more diodes.

3. The circuit of claim 2, wherein if the first diode is a single diode, a positive electrode of the first diode is coupled to a substrate of the PMOS transistor, a negative electrode of the first diode is coupled to another end of the first output capacitor, wherein the other end of the first output capacitor is a positive voltage output end.

4. The circuit of claim 2, wherein if the first diode comprises a plurality of diodes, the plurality of the first diodes are connected in series, a positive electrode of the first diode in the plurality of the first diodes that is connected to the PMOS transistor is connected to a substrate of the PMOS transistor, a negative electrode of the first diode in the plurality of the first diodes that is connected to the first output capacitor is connected to another end of the first output capacitor, the other end of the first output capacitor is a positive voltage output end.

5. The circuit of claim 1, wherein the second diodes comprises one or more diodes.

6. The circuit of claim 5, wherein if the second diode comprises a single diode, a positive electrode of the second diode is coupled to another end of the second output capacitor, a negative electrode of the second diode is coupled to a substrate of the NMOS transistor; the other end of the second output capacitor is a negative voltage output end.

7. The circuit of claim 5, wherein if the second diode comprises a plurality of diodes, the plurality of second diodes are connected in series, a positive electrode of the second diode in the plurality of second diodes that is connected to the second output capacitor is connected to another end of the second output capacitor, a negative electrode of the second diode in the plurality of second diodes that is connected to the NMOS transistor is connected to a substrate of the NMOS transistor; the other end of the second output capacitor is a negative voltage output end.

8. The circuit of claim 1, wherein a first transfer capacitor is connected between a substrate and a drain electrode of the PMOS transistor; a second transfer capacitor is connected between a substrate and a drain electrode of the NMOS transistor.

9. The circuit of claim 1, wherein the input end of the inverter is connected to the output end of the single-phase clock.

10. The circuit of claim 1, wherein the positive output voltage generated is higher than a power supply voltage; the negative output voltage generated is lower than a ground electrical level.

11. The circuit of claim 1, wherein, the substrate used in SOI process is high-resistivity silicon, or low-resistivity silicon, or silicon on complete insulator substrate.

12. An integrated circuit comprising a silicon-on-insulator (SOI) based positive/negative voltage generation circuit, the SOI-based positive/negative voltage generation circuit comprising:
   an inverter comprising an NMOS transistor and a PMOS transistor, a first transfer capacitor coupled to the PMOS transistor, a first output capacitor, a second transfer capacitor coupled to the NMOS transistor, a second output capacitor, a first diode disposed between the first transfer capacitor and the first output capacitor, a second diode disposed between the second transfer capacitor and the second output capacitor, one end of the first output capacitor is coupled to the ground, one end of the second output capacitor is coupled to the ground;
   wherein an output voltage of the inverter is controlled by a single-phase clock to flip periodically, charge the first transfer capacitor through a parasitic diode of the PMOS transistor, and charge the second transfer capacitor through a parasitic diode of the NMOS transistor;
   in a sub-circuit that generates a positive voltage, a unidirectional current flows from the first transfer capacitor through the first diode to the first output capacitor, thereby generating a positive output voltage; in a sub-circuit that generates a negative voltage, a unidirectional current flows from the second output capacitor through the second diode to the second transfer capacitor, thereby generating a negative output voltage.

13. The integrated circuit of claim 12, wherein the first diode comprises one or more diodes.

14. The integrated circuit of claim 13, wherein if the first diode is a single diode, a positive electrode of the first diode is coupled to a substrate of the PMOS transistor, a negative electrode of the first diode is coupled to another end of the first output capacitor, wherein the other end of the first output capacitor is a positive voltage output end.

15. The integrated circuit of claim 13, wherein if the first diode comprises a plurality of diodes, the plurality of first diodes are connected in series, a positive electrode of the first diode in the plurality of the first diodes that is connected to the PMOS transistor is connected to a substrate of the PMOS transistor, a negative electrode of the first diode in the plurality of the first diodes that is connected to the first output capacitor is connected to another end of the first output capacitor, the other end of the first output capacitor is a positive voltage output end.

16. The integrated circuit of claim 12, wherein if the second diode comprises a single diode, a positive electrode of the second diode is coupled to another end of the second output capacitor, a negative electrode of the second diode is coupled to a substrate of the NMOS transistor; the other end of the second output capacitor is a negative voltage output end.

17. The integrated circuit of claim 12, wherein if the second diode comprises a plurality of diodes, the plurality of second diodes are connected in series, a positive electrode of the second diode in the plurality of second diodes that is connected to the second output capacitor is connected to another end of the second output capacitor, a negative electrode of the second diode in the plurality of second diodes that is connected to the NMOS transistor is connected to a substrate of the NMOS transistor; the other end of the second output capacitor is a negative voltage output end.

18. The integrated circuit of claim 12, wherein a first transfer capacitor is connected between a substrate and a drain electrode of the PMOS transistor; a second transfer capacitor is connected between a substrate and a drain electrode of the NMOS transistor.

19. The integrated circuit of claim 12, wherein the input end of the inverter is connected to the output end of the single-phase clock.

20. The integrated circuit of claim 12, wherein the positive output voltage generated is higher than a power supply voltage; the negative output voltage generated is lower than a ground electrical level.

* * * * *